(12) United States Patent
Bullock et al.

(10) Patent No.: US 8,167,190 B1
(45) Date of Patent: May 1, 2012

(54) ELECTRICALLY CONDUCTIVE POLYMER COMPOSITIONS CONTAINING METAL PARTICLES AND A GRAPHENE AND METHODS FOR PRODUCTION AND USE THEREOF

(75) Inventors: Steven Bullock, Tehacahpi, CA (US); Robert W. Vanderwiel, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/103,016

(22) Filed: May 6, 2011

(51) Int. Cl.
*B23K 1/018* (2006.01)
*B23K 31/02* (2006.01)
*C08K 9/02* (2006.01)

(52) U.S. Cl. ...... 228/119; 228/191; 228/264; 228/248.1

(58) Field of Classification Search .................. None
See application file for complete search history.

(56) References Cited

U.S. PATENT DOCUMENTS

| | | | |
|---|---|---|---|
| 4,305,847 A | 12/1981 | Stoetzer et al. | |
| 5,691,689 A * | 11/1997 | Smith et al. | 338/22 R |
| 7,180,174 B2 | 2/2007 | Koning et al. | |
| 7,659,350 B2 | 2/2010 | Prud'Homme et al. | |
| 7,708,909 B2 | 5/2010 | Hougham et al. | |
| 7,745,528 B2 | 6/2010 | Prud'Homme et al. | |
| 2004/0000554 A1 * | 1/2004 | Griffin et al. | 220/304 |
| 2005/0136245 A1 * | 6/2005 | Arita et al. | 428/323 |
| 2007/0131915 A1 | 6/2007 | Stankovich et al. | |
| 2008/0011515 A1 * | 1/2008 | Sato | 174/94 R |
| 2008/0023665 A1 | 1/2008 | Weiser et al. | |
| 2008/0193827 A1 * | 8/2008 | Jang et al. | 429/41 |
| 2008/0230152 A1 | 9/2008 | Standing | |
| 2008/0274349 A1 | 11/2008 | Chiu et al. | |
| 2009/0068470 A1 * | 3/2009 | Choi et al. | 428/403 |
| 2009/0068471 A1 * | 3/2009 | Choi et al. | 428/408 |
| 2009/0087493 A1 * | 4/2009 | Dai et al. | 424/490 |
| 2009/0104386 A1 | 4/2009 | Barrera et al. | |
| 2009/0246521 A1 | 10/2009 | Swift et al. | |
| 2009/0269511 A1 * | 10/2009 | Zhamu et al. | 427/558 |
| 2009/0305135 A1 * | 12/2009 | Shi et al. | 429/217 |
| 2010/0000441 A1 * | 1/2010 | Jang et al. | 106/31.13 |
| 2010/0021657 A1 | 1/2010 | Lochtman et al. | |
| 2010/0028681 A1 * | 2/2010 | Dai et al. | 428/408 |
| 2010/0105834 A1 * | 4/2010 | Tour et al. | 525/50 |
| 2010/0126631 A1 | 5/2010 | Suh | |
| 2010/0133484 A1 | 6/2010 | Heo et al. | |
| 2010/0207056 A1 | 8/2010 | Hougham et al. | |
| 2010/0243107 A1 | 9/2010 | Schmid et al. | |
| 2010/0247892 A1 * | 9/2010 | Lee et al. | 428/221 |
| 2011/0117361 A1 * | 5/2011 | Hamilton et al. | 428/333 |
| 2011/0157772 A1 * | 6/2011 | Zhamu et al. | 361/502 |
| 2011/0162955 A1 * | 7/2011 | Butzloff et al. | 204/157.15 |
| 2011/0189452 A1 * | 8/2011 | Lettow et al. | 428/220 |

FOREIGN PATENT DOCUMENTS

| | | |
|---|---|---|
| JP | 2008-300342 | 12/2008 |
| JP | 2009-043672 | 2/2009 |
| KR | 10-2009-0059298 | 6/2009 |

OTHER PUBLICATIONS

Sruti et al., "Electrical Conductivity of Graphene Composites with In and In-Ga Alloy", Journal of Electronic Materials, (2010), vol. 39: No. 8, pp. 1268-1276.

Zhang et al., "Electrically conductive polyethylene terephthalate/graphene nanocomposites prepared by melt compounding", Polymer 51 (2010) pp. 1191-1196.

* cited by examiner

*Primary Examiner* — Kiley Stoner

(74) *Attorney, Agent, or Firm* — McDermott Will & Emery LLP

(57) ABSTRACT

Polymer compositions containing a polymer matrix, a graphene that is covalently bonded to the polymer matrix and metal particles are described herein. A combined concentration of the metal particles and the graphene in the polymer matrix exceeds an electrical percolation threshold. In general, the graphene has a carbon:oxygen ratio of at least about 20:1 so as to impart a high electrical conductivity thereto. The polymer compositions can be used as a lead-free solder material, in which case they can allow multiple rework operations to take place at a connection. Methods for making and using such electrically conductive polymer compositions are also described.

41 Claims, No Drawings

ELECTRICALLY CONDUCTIVE POLYMER COMPOSITIONS CONTAINING METAL PARTICLES AND A GRAPHENE AND METHODS FOR PRODUCTION AND USE THEREOF

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention generally relates to electrically conductive polymer compositions, and, more particularly, to electrically conductive polymer compositions containing a graphene.

BACKGROUND

Increasing demand for enhanced operational performance in a variety of commercial, industrial, and military products has paved the way for development of the next generation of high performance materials. Recent efforts in this regard have focused on nanomaterials due to their unique properties that are not usually observed in equivalent macroscale materials. Nowhere has the focus on nanomaterials been more profound than in the composite field, where the beneficial properties of the composite matrix and the nanomaterials can be effectively combined to produce a composite material exhibiting desirable properties of both components. Although many types of nanoscale composite materials have been prepared, electrically conductive polymer composites not based upon traditional metallic conductors have proven to be among the most studied for immediate practical applications.

Although lead has been traditionally used in numerous industrial applications, current regulations have mandated the phase out of lead in most commercial products. For example, the European Union issued regulations in 2006 that mandated the elimination of lead from coatings and solders used in most electronic components. Other countries have issued similar mandates.

Soldering applications, particularly in electronics and vehicle manufacturing, have been heavily impacted by the ban on lead. Many alternatives to traditional lead-based solder materials have been developed, In/Sn, Ga/Sn, Bi/Sn and Sn/Ag/Cu (SAC) alloys being among the most widely used. Although most lead-free solder materials are slightly more difficult to use than are traditional lead-based solder materials, the lead-free solder materials have typically proven satisfactory for most commercial applications. However, for certain high performance applications, lead-free solder materials have failed to tolerate commonly encountered operational conditions. Non-limiting examples of conditions under which lead-free solder materials can be unsatisfactory include, for example, extremely low temperatures and environments having thermal shock and high stress conditions. In addition, lead-free solder materials are prone to exhibit a coefficient of thermal expansion (CTE) mismatch with a substrate to which they are attached, ultimately leading to failure of the solder material. These limitations and others have limited the use of lead-free solder materials in aerospace and military applications, in particular.

A number of different metal nanoparticle compositions have been proposed for the next generation of lead-free solder materials. As the size of metal nanoparticles drops below about 20 nm, their melting point drops precipitously, thereby allowing certain metal nanoparticles such as, for example, copper and tin to be flowed at temperatures that are comparable to those of traditional lead-based solder materials (e.g., less than about 200° C.). However, once neat metal nanoparticles have been flowed to form a connection, they become at least partially fused together to form larger particles, at which stage they experience a rapid rise in melting point, approaching that of the corresponding bulk metal. Whereas the initial formation of a connection using metal nanoparticles can be extremely facile, rework can become quite problematic due to the much higher reflow temperatures typically needed after initial processing.

In view of the foregoing, lead-free, electrically conductive compositions that can be reworked and have enhanced performance under extreme conditions are needed in the art. The present invention satisfies this need and provides related advantages as well.

SUMMARY

In various embodiments, polymer compositions described herein include a polymer matrix, a graphene that is covalently bonded to the polymer matrix, and metal particles. A combined concentration of the metal particles and the graphene in the polymer matrix exceeds an electrical percolation threshold.

In other various embodiments, polymer compositions described herein include a polymer matrix containing a thermoplastic material, a graphene that is covalently bonded to the thermoplastic material, and metal particles. The graphene has a carbon:oxygen ratio of at least about 20:1. A combined concentration of the metal particles and the graphene in the polymer matrix exceeds an electrical percolation threshold.

In some embodiments, methods for making an electrically conductive polymer composition are described herein. The methods include reacting a graphene having a carbon:oxygen ratio of at least about 20:1 with a thermoplastic material to form covalent bonds therebetween, and after reacting, adding metal particles to the thermoplastic material. A combined concentration of the metal particles and the graphene in the thermoplastic material exceeds an electrical percolation threshold.

In some embodiments, methods for forming a connection are described herein. The methods include heating a solder material to at least its softening temperature, placing at least one member in the softened solder material, and cooling the softened solder material so as to affect hardening and to affix the at least one member thereto. The solder material contains an electrically conductive polymer composition that contains a thermoplastic material, a graphene that is covalently bonded to the thermoplastic material, and metal particles.

In some embodiments, methods for reworking a connection are described herein. The methods include heating a connection containing at least one member and a solder material to at least a softening temperature of the solder material, and removing the at least one member from the connection. The solder material contains an electrically conductive polymer composition that contains a thermoplastic material, a graphene that is covalently bonded to the thermoplastic material, and metal particles.

The foregoing has outlined rather broadly the features of the present disclosure in order that the detailed description that follows can be better understood. Additional features and advantages of the disclosure will be described hereinafter, which form the subject of the claims.

DETAILED DESCRIPTION

The present disclosure is directed, in part, to electrically conductive polymer compositions containing a graphene and metal particles. The present disclosure is also directed, in part, to methods for making and using such electrically conductive polymer compositions.

As noted previously, current lead-free solder materials can perform satisfactorily in most instances. However, for certain high performance applications, extreme temperatures, thermal shock, and/or mechanical stress can render their performance unsatisfactory in some cases. These issues can be exacerbated by CTE mismatch between the lead-free solder material and a substrate connected thereto. Although lead-free solder materials containing metal nanoparticles can exhibit high electrical conductivities and low initial processing temperatures, there has yet to be a satisfactory resolution to the issue of their rework.

Embodiments described herein take advantage of the high electrical conductivities offered by metal particles, particularly metal nanoparticles, while avoiding the aforementioned rework issues. Namely, the present embodiments make use of a polymer matrix to at least partially disperse the metal particles from one another, which minimizes or eliminates their ability to fuse into a solid metal mass that cannot be easily reworked. In addition, although the metal particles are by themselves electrically conductive, the polymer compositions described herein can have their electrical conductivities further enhanced by the inclusion of another nanomaterial, namely graphene, which is covalently bonded to the polymer matrix. Thus, the present embodiments make use of electrically conductive metal particles that are isolated from one another in a polymer matrix that is of itself electrically conductive. The graphene can enhance not only the electrical conductivities of the present compositions, but it can also lead to significant mechanical property enhancements. In this regard, the present polymer compositions can be particularly well suited for high performance applications, especially those in which formation of an electrical connection is desirable.

Even to the extent that the metal particles in the present polymer compositions may become fused to at least some degree during heating, the polymer matrix can mitigate the detrimental effects of metal particle fusion and still allow low temperature processing and rework operations to take place. Namely, since the polymer matrix serves as a continuous phase in which the metal particles are dispersed, heating the polymer matrix to at least its softening temperature can allow the composition as a whole to be flowed, regardless of whether the metal particles become liquefied during heating or not.

Thermoplastic materials are particularly advantageous in regard to rework of the present polymer compositions, since they can typically be softened multiple times through simple heating and re-hardened through cooling thereafter. Thermoplastic materials are also particularly advantageous for the high performance applications in which many lead-free solder materials experience shortcomings. Namely, certain thermoplastic materials can be especially resistant to thermal and mechanical stresses, particularly when their mechanical properties have been enhanced with a covalently bound graphene. Furthermore, thermoplastic materials can offer a better CTE match to substrate materials commonly used for forming some solder connections. For example, thermoplastic polymer matrices can offer a particularly good CTE match for electrical connections set upon a phenolic polymer substrate.

It should be recognized by one of ordinary skill in the art that since the present polymer compositions are electrically conductive, they can be used in any application in which electrical conductivity is desired, not just for the soldering applications described in detail herein. For example, in some embodiments, the present polymer compositions can be drawn into an electrically conductive wire or formed into an article. The end use of the articles formed from the polymer compositions need not necessarily take advantage of the electrical conductivity. In this regard, the present polymer compositions offer further advantages of being light weight alternatives to traditional materials.

As used herein, the term "graphene" refers to a single- or few-layer two-dimensional $sp^2$ carbon sheet that has an extremely high electrical conductivity, superior to that of bulk graphite. Whereas bulk graphite has poor mechanical properties, graphene has an extremely high mechanical strength. As isolated, graphene typically has at least some degree of oxygen functionality thereon, which can significantly lower its electrical conductivity, even to the extent of becoming an insulator. This form of graphene is commonly referred to as graphene oxide. The electrical conductivity can be at least partially restored by removing some of the oxygen functionality (e.g., through thermal defunctionalization or chemical reduction). Among the oxygen functionalities that can be present in a graphene sample include, for example, carboxylic acids, alcohols, carbonyl groups (e.g., aldehydes and ketones) and epoxides. These oxygen functionalities can lie at the edge of the graphene sheet or reside in the graphene basal plane. According to the present embodiments, a small amount of oxygen functionalities is allowed to remain on the graphene so as to facilitate covalent bonding thereto. Unless otherwise specified hereinafter, the term "graphene" will refer to a graphene that has at least some degree of electrical conductivity, while retaining sufficient oxygen functionalities to facilitate covalent bonding thereto. Covalent bonding ("tethering") using these oxygen functionalities can be accomplished in a number of ways known to one of ordinary skill in the art including, without limitation, exchange reactions of hydroxyl groups on the graphene with amine or mercaptan groups on the polymer matrix to form covalent bonds therebetween. Other modes of covalent bonding are discussed in more detail hereinafter.

As used herein, the terms "solder" or "soldering" refer to the process of connecting one or more members with a solder material. As used herein, the term "solder material" refers to a fusible composition that is used to affix one or more members.

As used herein, the terms "fuse," "fused," or "fusion" refer to a coalescence or partial coalescence between two or more metal particles.

As used herein, the term "nanoparticles" refers to particles having a size of about 100 nm or less in equivalent spherical diameter, although nanoparticles need not necessarily be spherical in shape.

As used herein, the term "electrical percolation threshold" refers to the combined concentration of metal particles and graphene in a polymer composition that is sufficient to achieve at least some electrical conductivity therein.

In various embodiments, polymer compositions described herein include a polymer matrix, a graphene that is covalently bonded to the polymer matrix, and metal particles. A combined concentration of the metal particles and the graphene in the polymer matrix exceeds an electrical percolation threshold. In some embodiments, such compositions can be a lead-free solder material.

In some embodiments, the present polymer compositions can have a sheet resistivity of less than about 1 ohm/square. In other embodiments, the polymer compositions can have a sheet resistivity of less than about 0.01 ohm/square. In still other embodiments, the polymer compositions can have a sheet resistivity ranging between about 0.01 ohm/square and about 0.0001 ohm/square. By way of a non-limiting comparative example, an acrylic polymer loaded with graphene at approximately 4.5% by weight produced a sheet resistivity of 0.77 ohm/square. As will be evident to one having ordinary skill in the art, sheet resistivity can be measured by a four-point probe method. Furthermore, one of ordinary skill in the art will recognize that resistivity and conductivity are mathematically related to one another, and knowing the resistivity will allow the electrical conductivity to be determined.

Even after removal of sufficient oxygen functionalities from graphene to restore its electrical conductivity, thousands or more oxygen functionalities can still remain in a typical graphene particle along its edges or within its basal plane. These remaining oxygen functionalities are more than sufficient to facilitate covalent bonding to a polymer matrix, mostly typically where the graphene particle serves as a crosslinking agent between multiple polymer chains and, optionally, metal particles. Numerous reactions to form covalent bonds to these oxygen functionalities can be envisioned by one having ordinary skill in the art. For example, carboxylic acids can be reacted to form esters and amides. Alcohols can be reacted to form ethers or esters or transformed into other reactive functional groups, in which case they can be reacted with functional groups such as amines and mercaptans, for example. Carbonyl groups and epoxides can be reacted with nucleophiles to form addition products. Other reactions can be envisioned by one having ordinary skill in the art, and the foregoing description should not be considered to exhaustively describe the scope of the bonding modes through which the graphene can be covalently bound to the polymer matrix and, optionally, the metal particles.

The method for producing an electrically conductive graphene is not particularly limited. Illustrative but non-limiting methods for producing a graphene suitable for use in the present embodiments include, for example, thermal deoxygenation, chemical deoxygenation, and combinations thereof. In non-limiting embodiments, chemical deoxygenation can be accomplished by treatment of a graphene with reductants such as, for example, hydrogen gas or hydrazine. In other non-limiting embodiments, thermal deoxygenation can be accomplished by heating a graphene at a temperature that is sufficient to remove at least some of its oxygen functionalities. In some embodiments, this temperature can be greater than about 1000° C. for about 10 minutes or more.

After deoxygenation, the graphene can have a variable carbon:oxygen ratio, depending on the period of time and method through which the deoxygenation was performed.

In general, at higher carbon:oxygen ratios, the graphene will more closely resemble pristine graphene, and the electrical conductivity will accordingly be higher. In some embodiments, the graphene has a carbon:oxygen ratio of at least about 20:1. In some embodiments, the graphene has a carbon:oxygen ratio of at least about 100:1. In some embodiments, the graphene has a carbon:oxygen ratio of at least about 1000:1. In some embodiments, the graphene has a carbon:oxygen ration between about 20:1 and about 1000:1, including all subranges in between.

In some embodiments, the polymer matrix of the polymer compositions can include a thermoplastic material. As noted previously, thermoplastic materials are particularly well suited for use in the present embodiments, since they can be easily formed into articles, extruded into wires, or heated to a softening temperature in order for rework operations to take place. Particularly preferred thermoplastic materials are those that are adapted for covalent bonding of graphene thereto, specifically thermoplastic materials that contain polar functional groups that are reactive with graphene. Illustrative but non-limiting examples of thermoplastic materials that contain functional groups that can be reactive with functional groups in graphene include polyacrylic acid, polyacrylates, polymethacrylic acid, polymethacrylates, polyvinyl alcohol, polyvinyl acetate, polycarbonates, polystyrenes, copolymers thereof, and combinations thereof. Other suitable thermoplastic materials can include, but are not limited to, block copolymers, having a first block formed from non-functionalized polymers such as, for example, polyethylene or polypropylene, and a second block formed from the above thermoplastic materials or others containing polar functional groups. It should also be noted that in some embodiments, polar functional groups in a thermoplastic material can be functionalized with a reagent that itself contains a functional group that is reactive with a functional group in graphene. Hence, derivatives of such thermoplastic materials are also considered to lie within the spirit and scope of the present disclosure. In one embodiment, a thermoplastic material that can be used in the polymer compositions herein is KRATON FG (a high performance elastomeric copolymer available from Kraton Polymers that contains polystyrene blocks, rubber blocks, and maleic anhydride blocks). The maleic anhydride blocks provide reactive functional groups to facilitate covalent bonding in this copolymer.

Thermoplastic block copolymers that contain polar functional groups that are reactive with a graphene can be particularly well suited for use in the present embodiments. Such block copolymers can provide reactive sites for covalent attachment ("tethering") to a graphene, while maintaining desirable structural properties conveyed by the block component not containing the reactive polar functional groups. In some embodiments, such block copolymers can be styrene-based copolymers including, for example, styrene/acrylate, styrene/methacrylate block copolymers, styrene/vinyl block alcohol copolymers, styrene/vinyl acetate block copolymers, and combinations thereof. Such styrenic polymers can provide particularly good thermal resistance and good resistance to oxidative degradation, while providing superior elongation characteristics. In addition, styrenic polymers can withstand repeated heating cycles, particularly when combined with appropriate additives such as, for example, phenolic materials, hindered amine light stabilizers (HALS), UV stabilizers, or antioxidant materials. Other illustrative thermoplastic block copolymers that can be particularly useful in the present embodiments include, for example, acrylate, methacrylate, vinyl alcohol or vinyl acetate copolymers with polyethylene, polypropylene, polyesters, polyamides, polycarbonates, polytetrafluoroethyelenes, polyvinyl chloride, polyurethanes, polyacrylonitriles, polysiloxanes, and the like.

In alternative embodiments, the polymer matrix can be a non-thermoplastic material such as, for example, an epoxy. For example, in an embodiment, graphene can be tethered to carboxy terminated butadiene nitrile (CTBN) epoxies (a nitrile modified epoxy).

In some embodiments, the polymer matrix having graphene covalently bonded thereto can be blended with another polymer matrix. Polymers that can be blended with the graphene-bound polymer matrix can include any thermoplastic material having suitable mechanical properties for the polymer composition's intended use. Illustrative but non-limiting examples of thermoplastic polymers that can be blended into the present polymer compositions include, for example, polyethylene, polypropylene, polyethylene terephthalate, polyesters, polyamides, polycarbonates, polystyrenes, polytetrafluoroethylenes, polyvinyl chloride, polyurethanes, polyacrylonitriles, polysiloxanes, and the like.

In some embodiments, the present compositions can further include at least one antioxidant material. Polymer matrices, particularly in the presence of metal particles, can be susceptible to degradation by atmospheric oxygen, which can degrade their mechanical properties in some embodiments. When used, the antioxidant material can be included in the polymer matrix in some embodiments, be part of the metal particles in other embodiments, or be present in both locations in still other embodiments. It should be noted that the metal particles can also be susceptible to oxidation, particularly when the metal particles are metal nanoparticles, but dispersal of the metal particles in the polymer matrix can help to at least partially mitigate metal particle oxidation in some cases. Furthermore, as described hereinafter, the metal particles can also include an additive that can convey further oxidation resistance thereto, in addition to other beneficial properties.

Illustrative but non-limiting antioxidant materials that can be used in the present embodiments include, for example, hindered phenols [e.g., BHT (2,6-di-t-butyl-p-cresol), 2,2'-methylenebis(6-t-butyl-p-cresol), 1,3,5-trimethyl-2,4,6-tris (3,5-di-t-butyl-4-hydroxybenzyl)benzene, and tetrakis[methylene(3,5-di-t-butyl-4-hydroxyhydrocinnamate)] methane], secondary aromatic amines (e.g., p-phenylenediamine and diphenylamine), hydroxylamines, benzofuranones, divalent sulfur compounds, trivalent phosphorus compounds, derivatives thereof, and the like. Other antioxidant materials that can be used in the present embodiments include, for example, ascorbic acid, butylated hydroxyanisole, gallate esters (e.g., propyl gallate), and α-tocopherol. In one embodiment, the antioxidant material can be 2-mercaptobenzothiazole (2-MBT), triazoles, or other heterocyclic compounds that convey oxidation and corrosion resistance to the metal particles.

The identity of the metal particles used in the present embodiments is not particularly limited. However, metals that have a high electrical conductivity and are relatively low in cost are believed to be the most suitable for use in the present embodiments. Illustrative examples of metal particles that can be used in the present embodiments include, for example, copper, tin, aluminum, silver, gold, alloys thereof, and combinations thereof.

In some embodiments, the metal particles used in the present embodiments can be metal nanoparticles. In some embodiments, the metal nanoparticles can be at most about 100 nm in size. In other embodiments, the metal nanoparticles can be at most about 50 nm in size. In still other embodiments, the metal nanoparticles can be at most about 20 nm in size. As noted previously, metal nanoparticles that are about 20 nm in size or smaller can display significantly reduced melting points relative to the corresponding bulk metals. The low melting point of metal nanoparticles about 20 nm in size or smaller in size can be particularly advantageous for use in the present embodiments.

In some embodiments, a percentage of the graphene in the polymer compositions can range between about 0.1% and about 10% by weight. Lower weight percentages of the graphene within this range can generally used in the presence of higher concentrations of metal particles. In some embodiments, a percentage of the graphene in the polymer compositions can range between about 0.1% and about 5% by weight. In other embodiments, a percentage of the graphene in the polymer compositions can range between about 0.1% and about 3% by weight. In still other embodiments, a percentage of the graphene in the polymer compositions can range between about 3% and about 5% by weight.

In some embodiments, the metal particles can be present in the polymer compositions at up to about 50% by weight. In some embodiments, a percentage of the metal particles in the polymer compositions can range between about 0.1% and about 50% by weight. In other embodiments, a weight percentage of the metal particles in the polymer compositions can range between about 1% and about 45% by weight. In still other embodiments, a weight percentage of the metal particles in the polymer compositions can range between about 5% and about 40% by weight.

In some embodiments, the metal particles, particularly metal nanoparticles, can further contain an additive that is covalently bonded thereto. In some embodiments, such additives can be covalently bound to a surface of the metal particles. The inclusion of an additive with the metal particles can serve many purposes including, without limitation, to inhibit oxidation of the metal particles or the polymer matrix, to discourage aggregation of the metal particles, and/or to facilitate covalent bonding of the metal particles to the polymer matrix and/or to the graphene. In some embodiments, the additive on the metal particles can further include a functional group that is reactive with the polymer matrix, the graphene, or both. Accordingly, in some embodiments, at least a portion of the metal particles can be covalently bonded to the polymer matrix, the graphene, or both.

The identity of the additive included with the metal particles is not particularly limited. Generally, it is preferred that the additive not significantly lower the electrical conductivity of the metal particles. However, the electrical conductivity imparted to the polymer matrix by the graphene can be sufficient to overcome any lowering of the electrical conductivity of the metal particles in some cases. Additives that can become covalently bonded to the surface of metal particles include compounds that contain a thiol group in some embodiments, thereby resulting in formation of a metal-sulfur bond to the metal particles. Illustrative but non-limiting examples of such additives include 1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2 (3H)-thione, 5-amino-1,3,4-thiadiazole, 6-amino-2-mercaptobenzothiazole, 6-ethoxy-2-mercaptobenzothiazole, 6-mercaptopurine, N-cycloalkyl-dithiocarbamates, alkyl- and cycloalkyl mercaptans, benzothiazoles, dimercaptopyridines, dimethyldithiocarbamic acid, dithiocyanuric acid, mercaptobenzothiazoles, mercaptobenzoxazoles, mercaptoethanesulfonic acid, mercaptoimidazoles, mercaptopyridines, mercaptopyrimidines, mercaptoquinolines, mercaptothiazoles, mercaptothiazolines, mercaptotriazoles, O,O- dialkyl- and O,O-dicycloalkyldithiophosphates, O-alkyl- or O-cycloalkyldithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 2-mercaptobenzothiazole, diethyldithiocarbamic acid, 5-amino-1,3,4,-thiadiazole-2-thiol, 1,2,3-benzothiazole, 1-pyrollidinecarbodithioic acid, 1-(4-hydroxyphenyl)-1H-tetrazol-5-thiol, 2-mercapto-5-nitrobenzimidazole, 2-mercapto-5-methylbenzimidazole, mercaptobenzothiazoles, mercaptothiazolines, mercaptobenzimidazoles, 5,5-dithiobis(1,3,4-thiadiazole-2(3H)-thione, trithiocyanuric acid, 2,4-dithiohydantoin, 2,4-dimercapto-6-amino-5-triazine, derivatives thereof, and mixtures thereof. In other embodiments, suitable additives can include compounds such as, for example, silanes, silanols, and their derivatives. These additives or derivatives thereof can be further functionalized, if needed, such that they have functional groups that can be reactive with the polymer matrix and/or the graphene. One of ordinary skill in the art will recognize suitable functional groups that can be included on the additives so as to make them reactive with the polymer matrix, the graphene, or both.

In other embodiments, the additive coating the metal particles can be a surfactant. Illustrative surfactants that are suitable for coating metal particles can include, for example, long chain monodentate and bidentate amines. In some embodiments, surfactant additives can be covalently bonded to the metal particles. In alternative embodiments, the surfactant additives are not covalently bonded to the metal particles.

In certain embodiments, polymer compositions described herein include a polymer matrix containing a thermoplastic material, a graphene that is covalently bonded to the thermoplastic material, and metal particles. The graphene has a carbon:oxygen ratio of at least about 20:1. A combined concentration of the metal particles and the graphene in the polymer matrix exceeds an electrical percolation threshold.

Although the polymer compositions described herein can be formed by any method, it is generally believed to be preferable to react the graphene with a pre-formed polymer matrix that contains polar functional groups that can be reactive with the graphene. While the graphene can also be reacted with a monomer and then polymerized, it is expected that the resulting polymer compositions have better mechanical properties when the graphene is reacted with an existing polymer matrix. Without being bound by theory or mechanism, it is believed that graphene-bound monomers may not polymerize to an extent needed to produce optimal mechanical properties. That is, graphene bound monomers may not achieve a sufficient polymer molecular weight to produce optimal mechanical properties. In some embodiments, the metal particles can be added to the polymer matrix thereafter so as not to interfere with the process of covalent bonding of the graphene to the polymer matrix. However, in alternative embodiments, the metal particles can be added before covalently bonding the graphene to the polymer matrix in certain cases.

In some embodiments, methods for making an electrically conductive polymer composition are described herein. The methods include reacting a graphene having a carbon:oxygen ratio of at least about 20:1 with a thermoplastic material to form covalent bonds therebetween, and after reacting, adding metal particles to the thermoplastic material. A combined concentration of the metal particles and the graphene in the thermoplastic material exceeds an electrical percolation threshold. In some embodiments, adding metal particles to the thermoplastic material can involve blending the metal particles with the thermoplastic material.

In some embodiments, the methods for forming an electrically conductive polymer composition can include adding at least one antioxidant material to the thermoplastic material. Illustrative antioxidant materials have been considered in detail hereinabove.

In some embodiments, the metal particles used in the present methods can further contain an additive that is covalently bonded thereto. Illustrative examples of such additives for metal nanoparticles have been set forth in detail hereinabove. In some embodiments, the additive can further contain a functional group that is reactive with the thermoplastic material, the graphene, or both. In some embodiments, present methods can further include reacting the metal particles with the graphene, the thermoplastic material, or both so as to form covalent bonds therebetween.

In other various embodiments, methods for using the present polymer compositions in forming a connection and in reworking a connection are described herein. In some embodiments, the connection can be an electrical connection such as, for example, a solder joint in a circuit board or like electronic device.

In some embodiments, methods for forming a connection are described herein. The methods include heating a solder material to at least its softening temperature, placing at least one member in the softened solder material, and cooling the softened solder material so as to affect hardening and to affix the at least one member thereto. The solder material contains an electrically conductive polymer composition that contains a thermoplastic material, a graphene that is covalently bonded to the thermoplastic material, and metal particles.

In some embodiments, the solder material can be reworkable after being cooled into a hardened state. As noted previously, polymer compositions forming the present solder materials utilize the properties of thermoplastic materials to achieve such reworkability.

In some embodiments, methods for reworking a connection are described herein. The methods include heating a connection containing at least one member and a solder material to at least a softening temperature of the solder material, and removing the at least one member from the connection. The solder material contains an electrically conductive polymer composition that contains a thermoplastic material, a graphene that is covalently bonded to the thermoplastic material, and metal particles.

In some embodiments, the methods for reworking a connection can further include adding at least one replacement member to the connection. In some embodiments, such methods can further include cooling the softened solder material so as to affect hardening and to affix the at least one replacement member to the connection.

In other various embodiments, methods for reworking a connection can further include removing the softened solder material from the connection. In further embodiments, such methods can further include adding a fresh solder material to the connection, heating the fresh solder material to at least its softening temperature, placing at least one replacement member in the softened, fresh solder material, and cooling the softened, fresh solder material so as to affect hardening and to affix the at least one replacement member to the connection. In such embodiments, the fresh solder material can be the same as or different than the solder material originally used. In some embodiments, the fresh solder material can be an electrically conductive polymer composition containing a thermoplastic material, a graphene that is covalently bonded to the thermoplastic material, and metal particles.

It is to be understood that modifications which do not substantially affect the activity of the various embodiments of this invention are also included within the definition of the invention provided herein. Although the invention has been described with reference to the disclosed embodiments, one of ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to one of ordinary skill in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is the following:

1. A polymer composition comprising:
   a polymer matrix;
   a graphene that is covalently bonded to the polymer matrix; and
   metal particles having an additive covalently bonded thereto;
   wherein the additive comprises a thiol, a silane, a silanol, a monodentate amine, a bidentate amine, or any combination thereof; and wherein a combined concentration of the metal particles and the graphene in the polymer matrix exceeds an electrical percolation threshold.

2. The polymer composition of claim 1, wherein the polymer composition comprises a lead-free solder material.

3. The polymer composition of claim 1, wherein the polymer matrix comprises a thermoplastic material.

4. The polymer composition of claim 3, wherein the thermoplastic material comprises polar functional groups that are reactive with the graphene.

5. The polymer composition of claim 3, wherein the thermoplastic material comprises a polymer selected from the group consisting of polyacrylic acid, polyacrylates, polymethacrylic acid, polymethacrylates, polyvinyl alcohol, polyvinyl acetate, polycarbonates, acrylic acid copolymers, acrylate copolymers, methacrylic acid copolymers, methacrylate copolymers, vinyl alcohol copolymers, vinyl acetate copolymers, styrene copolymers, derivatives thereof, and combinations thereof.

6. The polymer composition of claim 1, wherein the graphene has a carbon:oxygen ratio of at least about 20:1.

7. The polymer composition of claim 1, wherein the graphene has a carbon:oxygen ratio of at least about 100:1.

8. The polymer composition of claim 1, further comprising:
   at least one antioxidant material.

9. The polymer composition of claim 1, wherein the metal particles comprise metal nanoparticles that are at most about 100 nm in size.

10. The polymer composition of claim 1, wherein the metal particles comprise metal nanoparticles that are at most about 20 nm in size.

11. The polymer composition of claim 1, wherein the additive further comprises a functional group that is reactive with the polymer matrix, the graphene, or both.

12. The polymer composition of claim 11, wherein at least a portion of the metal particles are covalently bonded to the polymer matrix, the graphene, or both.

13. The polymer composition of claim 1, wherein the additive is selected from the group consisting of 1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3, 4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, N-cycloalkyl-dithiocarbamates, alkyl- and cycloalkyl mercaptans, benzothiazoles, dimercaptopyridines, dimethyldithiocarbamic acid, dithiocyanuric acid, mercaptobenzothiazoles, mercaptobenzoxazoles, mercaptoethanesulfonic acid, mercaptoimidazoles, mercaptopyridines, mercaptopyrimidines, mercaptoquinolines, mercaptothiazoles, mercaptothiazolines, mercaptotriazoles, O,O-dialkyl- and O,O-dicycloalkyldithiophosphates, O-alkyl- or O-cycloalkyldithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 2-mercaptobenzothiazole, diethyldithiocarbamic acid, 5-amino-1,3,4,-thiadiazole-2-thiol, 1,2,3-benzothiazole, 1-pyrollidinecarbodithioic acid, 1-(4-hydroxyphenyl)-1H-tetrazol-5-thiol, 2-mercapto-5-nitrobenzimidazole, 2-mercapto-5-methylbenzimidazole, mercaptobenzothiazoles, mercaptothiazolines, mercaptobenzimidazoles, 5,5-dithio-bis(1,3,4-thiadiazole-2(3H)-thione, trithiocyanuric acid, 2,4-dithiohydantoin, 2,4-dimercapto-6-amino-5-triazine, silanes, silanols, derivatives thereof, and mixtures thereof.

14. The polymer composition of claim 1, wherein the metal particles comprise at least one metal selected from the group consisting of copper, tin, aluminum, silver and gold.

15. The polymer composition of claim 1, wherein the polymer composition has a sheet resistivity of less than about 0.01 ohm/square.

16. A polymer composition comprising:
   a polymer matrix comprising a thermoplastic material;
   a graphene that is covalently bonded to the thermoplastic material;
   wherein 1) the graphene has a carbon:oxygen ratio of at least about 20:1; and
   metal particles having an additive covalently bonded thereto;
   2) the additive comprises a thiol, a silane, a silanol, a monodentate amine, a bidentate amine, or any combination thereof and 3) a combined concentration of the metal particles and the graphene in the polymer matrix exceeds an electrical percolation threshold.

17. The polymer composition of claim 16, wherein the thermoplastic material comprises a polymer selected from the group consisting of polyacrylic acid, polyacrylates, polymethacrylic acid, polymethacrylates, polyvinyl alcohol, polyvinyl acetate, polycarbonates, acrylic acid copolymers, acrylate copolymers, methacrylic acid copolymers, methacrylate copolymers, vinyl alcohol copolymers, vinyl acetate copolymers, styrene copolymers, derivatives thereof, and combinations thereof.

18. The polymer composition of claim 16, further comprising:
at least one antioxidant material.

19. The polymer composition of claim 16, wherein the additive further comprises a functional group that is reactive with the polymer matrix, the graphene, or both.

20. The polymer composition of claim 19, wherein at least a portion of the metal particles are covalently bonded to the polymer matrix, the graphene, or both.

21. The polymer composition of claim 16, wherein the additive is selected from the group consisting of 1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, N-cycloalkyl-dithiocarbamates, alkyl- and cycloalkyl mercaptans, benzothiazoles, dimercaptopyridines, dimethyldithiocarbamic acid, dithiocyanuric acid, mercaptobenzothiazoles, mercaptobenzoxazoles, mercaptoethanesulfonic acid, mercaptoimidazoles, mercaptopyridines, mercaptopyrimidines, mercaptoquinolines, mercaptothiazoles, mercaptothiazolines, mercaptotriazoles, O,O-dialkyl- and O,O-dicycloalkyldithiophosphates, O-alkyl- or O-cycloalkyldithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 2-mercaptobenzothiazole, diethyldithiocarbamic acid, 5-amino-1,3,4,-thiadiazole-2-thiol, 1,2,3-benzothiazole, 1-pyrollidinecarbodithioic acid, 1-(4-hydroxyphenyl)-1H-tetrazol-5-thiol, 2-mercapto-5-nitrobenzimidazole, 2-mercapto-5-methylbenzimidazole, mercaptobenzothiazoles, mercaptothiazolines, mercaptobenzimidazoles, 5,5-dithio-bis(1,3,4-thiadiazole-2(3H)-thione, trithiocyanuric acid, 2,4-dithiohydantoin, 2,4-dimercapto-6-amino-5-triazine, silanes, silanols, derivatives thereof, and mixtures thereof.

22. The polymer composition of claim 16, wherein the metal particles comprise metal nanoparticles that are at most about 100 nm in size.

23. The polymer composition of claim 16, wherein the metal particles comprise metal nanoparticles that are at most about 20 nm in size.

24. The polymer composition of claim 16, wherein the polymer composition has a sheet resistivity of less than about 0.01 ohm/square.

25. A method for making an electrically conductive polymer composition, the method comprising:
reacting a graphene having a carbon:oxygen ratio of at least about 20:1 with a thermoplastic material to form covalent bonds therebetween; and
after reacting, adding metal particles to the thermoplastic material;

1) wherein the metal particles have an additive covalently bonded thereto;
2) the additive comprises a thiol, a silane, a silanol, a monodentate amine, a bidentate amine, or any combination thereof and 3) a combined concentration of the metal particles and the graphene in the thermoplastic material exceeds an electrical percolation threshold.

26. The method of claim 25, wherein adding metal particles to the thermoplastic material comprises blending the metal particles with the thermoplastic material.

27. The method of claim 25, wherein the thermoplastic material comprises a polymer selected from the group consisting of polyacrylic acid, polyacrylates, polymethacrylic acid, polymethacrylates, polyvinyl alcohol, polyvinyl acetate, polycarbonates, acrylic acid copolymers, acrylate copolymers, methacrylic acid copolymers, methacrylate copolymers, vinyl alcohol copolymers, vinyl acetate copolymers, styrene copolymers, derivatives thereof, and combinations thereof.

28. The method of claim 25, further comprising:
adding at least one antioxidant material to the thermoplastic material.

29. The method of claim 25, wherein the additive is selected from the group consisting of 1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, N-cycloalkyl-dithiocarbamates, alkyl- and cycloalkyl mercaptans, benzothiazoles, dimercaptopyridines, dimethyldithiocarbamic acid, dithiocyanuric acid, mercaptobenzothiazoles, mercaptobenzoxazoles, mercaptoethanesulfonic acid, mercaptoimidazoles, mercaptopyridines, mercaptopyrimidines, mercaptoquinolines, mercaptothiazoles, mercaptothiazolines, mercaptotriazoles, O,O-dialkyl- and O,O-dicycloalkyldithiophosphates, O-alkyl- or O-cycloalkyldithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 2-mercaptobenzothiazole, diethyldithiocarbamic acid, 5-amino-1,3,4,-thiadiazole-2-thiol, 1,2,3-benzothiazole, 1-pyrollidinecarbodithioic acid, 1-(4-hydroxyphenyl)-1H-tetrazol-5-thiol, 2-mercapto-5-nitrobenzimidazole, 2-mercapto-5-methylbenzimidazole, mercaptobenzothiazoles, mercaptothiazolines, mercaptobenzimidazoles, 5,5-dithio-bis(1,3,4-thiadiazole-2(3H)-thione, trithiocyanuric acid, 2,4-dithiohydantoin, 2,4-dimercapto-6-amino-5-triazine, silanes, silanols, derivatives thereof, and mixtures thereof.

30. The method of claim 25, wherein the additive further comprises a functional group that is reactive with the thermoplastic material, the graphene, or both.

31. The method of claim 30, further comprising:
reacting the metal particles with the graphene, the thermoplastic material, or both so as to form covalent bonds therebetween.

32. The method of claim 25, wherein the metal particles comprise metal nanoparticles that are at most about 100 nm in size.

33. The method of claim 25, wherein the metal particles comprise metal nanoparticles that are at most about 20 nm in size.

34. A method for forming a connection, the method comprising:
heating a solder material to at least its softening temperature;
wherein the solder material comprises an electrically conductive polymer composition that comprises a thermoplastic material, a graphene that is covalently bonded to the thermoplastic material, and metal particles;
placing at least one member in the softened solder material; and
cooling the softened solder material so as to affect hardening and to affix the at least one member thereto.

35. The method of claim 34, wherein the solder material is reworkable after being cooled into a hardened state.

36. A method for reworking a connection, the method comprising:
heating a connection comprising at least one member and a solder material to at least a softening temperature of the solder material;
wherein the solder material comprises an electrically conductive polymer composition that comprises a thermoplastic material, a graphene that is covalently bonded to the thermoplastic material, and metal particles; and
removing the at least one member from the connection.

37. The method of claim 36, further comprising:
adding at least one replacement member to the softened solder material.

38. The method of claim 36, further comprising:
removing the softened solder material from the connection.

39. The method of claim 38, further comprising:
adding a fresh solder material to the connection;
wherein the fresh solder material comprises an electrically conductive polymer composition that comprises a thermoplastic material, a graphene that is covalently bonded to the thermoplastic material, and metal particles;
heating the fresh solder material to at least its softening temperature;
placing at least one replacement member in the softened, fresh solder material; and
cooling the softened, fresh solder material so as to affect hardening and to affix the at least one replacement member thereto.

40. A polymer composition comprising:
a polymer matrix;
a graphene that is covalently bonded to the polymer matrix; and
metal particles having an additive covalently bonded thereto;
wherein the additive is selected from the group consisting of 1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, N-cycloalkyl-dithiocarbamates, alkyl- and cycloalkyl mercaptans, benzothiazoles, dimercaptopyridines, dimethyldithiocarbamic acid, dithiocyanuric acid, mercaptobenzothiazoles, mercaptobenzoxazoles, mercaptoethanesulfonic acid, mercaptoimidazoles, mercaptopyridines, mercaptopyrimidines, mercaptoquinolines, mercaptothiazoles, mercaptothiazolines, mercaptotriazoles, O,O-dialkyl- and O,O-dicycloalkyldithiophosphates, O-alkyl- or O-cycloalkyldithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 2-mercaptobenzothiazole, diethyldithiocarbamic acid, 5-amino-1,3,4,-thiadiazole-2-thiol, 1,2,3-benzothiazole, 1-pyrollidinecarbodithioic acid, 1-(4-hydroxyphenyl)-1H-tetrazol-5-thiol, 2-mercapto-5-nitrobenzimidazole, 2-mercapto-5-methylbenzimidazole, mercaptobenzothiazoles, mercaptothiazolines, mercaptobenzimidazoles, 5,5-dithiobis(1,3,4-thiadiazole-2(3H)-thione, trithiocyanuric acid, 2,4-dithiohydantoin, 2,4-dimercapto-6-amino-5-triazine, silanes, silanols, derivatives thereof, and mixtures thereof;
wherein a combined concentration of the metal particles and the graphene in the polymer matrix exceeds an electrical percolation threshold.

41. A method for making an electrically conductive polymer composition, the method comprising:
reacting a graphene having a carbon:oxygen ratio of at least about 20:1 with a thermoplastic material to form covalent bonds therebetween; and
after reacting, adding metal particles to the thermoplastic material;
wherein the metal particles have an additive covalently bonded thereto;
wherein the additive is selected from the group consisting of 1,3,4-thiadiazole, 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, N-cycloalkyl-dithiocarbamates, alkyl- and cycloalkyl mercaptans, benzothiazoles, dimercaptopyridines, dimethyldithiocarbamic acid, dithiocyanuric acid, mercaptobenzothiazoles, mercaptobenzoxazoles, mercaptoethanesulfonic acid, mercaptoimidazoles, mercaptopyridines, mercaptopyrimidines, mercaptoquinolines, mercaptothiazoles, mercaptothiazolines, mercaptotriazoles, O,O-dialkyl- and O,O-dicycloalkyldithiophosphates, O-alkyl- or O-cycloalkyldithiocarbonates, o-ethylxanthic acid, quinoxaline-2,3-thiol, thioacetic acid, thiocresol, thiosalicylic acid, trithiocyanuric acid, 6-ethoxy-2-mercaptobenzothiazole, 2-mercaptobenzothiazole, diethyldithiocarbamic acid, 5-amino-1,3,4,-thiadiazole-2-thiol, 1,2,3-benzothiazole, 1-pyrollidinecarbodithioic acid, 1-(4-hydroxyphenyl)-1H-tetrazol-5-thiol, 2-mercapto-5-nitrobenzimidazole, 2-mercapto-5-methylbenzimidazole, mercaptobenzothiazoles, mercaptothiazolines, mercaptobenzimidazoles, 5,5-dithio-bis(1,3,4-thiadiazole-2(3H)-thione, trithiocyanuric acid, 2,4-dithiohydantoin, 2,4-dimercapto-6-amino-5-triazine, silanes, silanols, derivatives thereof, and mixtures thereof; and wherein a combined concentration of the metal particles and the graphene in the thermoplastic material exceeds an electrical percolation threshold.

\* \* \* \* \*